(12) United States Patent
Sawicki et al.

(10) Patent No.: US 7,389,473 B1
(45) Date of Patent: *Jun. 17, 2008

(54) REPRESENTING USER EDIT PERMISSION OF REGIONS WITHIN AN ELECTRONIC DOCUMENT

(75) Inventors: Martin Sawicki, Kirland, WA (US); Robert Little, Redmond, WA (US); Brian Jones, Redmond, WA (US); Katsuhiro Alex Namba, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

This patent is subject to a terminal disclaimer.

(21) Appl. No.: 10/731,274

(22) Filed: Dec. 9, 2003

Related U.S. Application Data

(63) Continuation-in-part of application No. 10/187,060, filed on Jun. 28, 2002.

(51) Int. Cl.
*G06F 17/00* (2006.01)
(52) U.S. Cl. .................. 715/255; 715/237; 715/741
(58) Field of Classification Search ............. 715/501.1, 715/530, 531, 255, 237, 741
See application file for complete search history.

(56) References Cited

U.S. PATENT DOCUMENTS

| 4,751,740 A | 6/1988 | Wright ....................... 382/180 |
| 4,864,501 A | 9/1989 | Kucera et al. .................. 704/8 |
| 4,866,777 A | 9/1989 | Mulla et al. ................. 704/206 |
| 5,295,266 A * | 3/1994 | Hinsley et al. ............. 718/101 |
| 5,557,722 A * | 9/1996 | DeRose et al. ............. 715/513 |
| 5,579,466 A | 11/1996 | Habib et al. ................. 715/529 |
| 5,787,451 A | 7/1998 | Mogilevsky ................ 715/533 |
| 5,881,225 A * | 3/1999 | Worth ........................ 726/17 |
| 6,023,714 A | 2/2000 | Hill et al. ................... 715/513 |
| 6,031,989 A | 2/2000 | Cordell ....................... 717/109 |
| 6,044,387 A | 3/2000 | Angiulo et al. ............. 715/533 |
| 6,092,068 A | 7/2000 | Dinkelacker ................ 707/100 |
| 6,119,136 A * | 9/2000 | Takata et al. ............... 715/513 |
| 6,141,754 A * | 10/2000 | Choy ........................... 726/1 |
| 6,182,029 B1 | 1/2001 | Friedman ...................... 704/9 |
| 6,209,124 B1 | 3/2001 | Vermeire et al. ........... 717/114 |
| 6,230,173 B1 | 5/2001 | Ferrel et al. ................ 715/513 |
| 6,233,592 B1 | 5/2001 | Schnelle et al. ............ 715/513 |

(Continued)

FOREIGN PATENT DOCUMENTS

EP 1230566 2/2005

OTHER PUBLICATIONS

Ayers, L., "AbiWord's Potential," Linux Gazette, Issue 43, Jul. 1999, downloaded from: www.linuxgazette.com/issue43/ayers.html, downloaded pp. 1-4.*

(Continued)

*Primary Examiner*—William L. Bashore
*Assistant Examiner*—Laurie Ries
(74) *Attorney, Agent, or Firm*—Merchant & Gould P.C.; Ryan T. Grace

(57) ABSTRACT

Regions within editable objects of electronic document can be defined such that specific editing permissions can be granted to specific users for specific regions. The regions can be expressed in a ML format such that a variety of applications that consume ML content can operate in accordance with the granted permissions.

16 Claims, 6 Drawing Sheets

U.S. PATENT DOCUMENTS

| | | | |
|---|---|---|---|
| 6,249,794 B1 | 6/2001 | Raman | 715/500 |
| 6,336,124 B1 | 1/2002 | Alam et al. | 715/523 |
| 6,397,232 B1 | 5/2002 | Chen-Hung et al. | 715/523 |
| 6,507,856 B1 | 1/2003 | Chen et al. | 715/513 |
| 6,507,857 B1 | 1/2003 | Yalcinalp | 715/513 |
| 6,519,617 B1 | 2/2003 | Wanderski et al. | 715/513 |
| 6,535,896 B2 | 3/2003 | Britton et al. | 715/523 |
| 6,538,673 B1 | 3/2003 | Maslov | 715/853 |
| 6,675,353 B1 | 1/2004 | Friedman | 715/513 |
| 6,697,999 B1 | 2/2004 | Breuer et al. | 715/517 |
| 6,725,423 B1 | 4/2004 | Muramoto et al. | 715/513 |
| 6,725,426 B1 | 4/2004 | Pavlov | 715/523 |
| 6,754,648 B1 | 6/2004 | Fittges et al. | 707/1 |
| 6,763,500 B2 | 7/2004 | Black et al. | 715/513 |
| 6,785,685 B2 | 8/2004 | Soetarman et al. | 707/101 |
| 6,799,299 B1 | 9/2004 | Li et al. | 715/513 |
| 6,829,570 B1 | 12/2004 | Thambynayagam et al. | 703/10 |
| 6,829,745 B2 | 12/2004 | Yassin et al. | 715/513 |
| 6,845,483 B1 | 1/2005 | Carroll | 715/513 |
| 6,886,115 B2 | 4/2005 | Kondoh et al. | 714/52 |
| 6,918,086 B2 | 7/2005 | Rogson | 715/533 |
| 6,938,204 B1 | 8/2005 | Hind et al. | 715/515 |
| 6,941,510 B1 | 9/2005 | Ozzie et al. | 715/513 |
| 6,968,503 B1 | 11/2005 | Chang et al. | 715/526 |
| 6,996,772 B2 | 2/2006 | Justice et al. | 715/513 |
| 7,028,009 B2* | 4/2006 | Wang et al. | 705/51 |
| 2001/0014900 A1 | 8/2001 | Brauer et al. | 707/513 |
| 2002/0091725 A1 | 7/2002 | Skok | 707/501.1 |
| 2002/0124115 A1 | 9/2002 | McLean et al. | 709/310 |
| 2003/0007014 A1 | 1/2003 | Suppan et al. | 345/853 |
| 2003/0101416 A1 | 5/2003 | McInnes et al. | 715/513 |
| 2003/0163784 A1* | 8/2003 | Daniel et al. | 715/514 |
| 2003/0167444 A1 | 9/2003 | Zorc | 715/513 |
| 2003/0231626 A1 | 12/2003 | Chuah et al. | 370/389 |
| 2004/0098320 A1 | 5/2004 | Mitsuhashi et al. | 705/27 |
| 2004/0194035 A1 | 9/2004 | Chakraborty | 715/531 |
| 2004/0205553 A1 | 10/2004 | Hall et al. | 715/513 |

OTHER PUBLICATIONS

Patrick Marshall; *DocuShare 2.0 Makes Web Document Management Work*; Sep. 27, 1999.

Dan Franks; *Crowd Control* (Secrets); Jun. 1, 2002; MacWorld, vol. 19, No. 6; p. 102.

John Lombardi; *Word Pro Excels at 'Team' Work*; InfoWorld Jan. 8, 1996; p. 86.

Kathy Yakal; *Elegant Document Distribution*; Computer Shopper Nov. 1995; pp. 1-2.

Jon Udell; *Getting Traction*; Jul. 12, 2002.

Pradeep Jain; "Creating XML from Microsoft Word: The Challenges", Dec. 3-8, 2000, pp. 136-144.

Jon Bosak, "XML: The Universal Publishing Format", 1998, pp. 1-2.

M. Fernandez et al., "Advanced Technology Seminar", p. 323.

Uros Novak et al., "Experimental XSLT Processor for Objects", Proceedings of the IASTED International Conference, Applied Informatics, Feb. 18-21, 2002, pp. 277-282.

"XML Schema Part 1: Structures", W3C Recommendation, May 2, 2001, downloaded from http://www.w3.org/TR2001/REC-xmlschema-1-20010502/, pp. 1-19.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

"XML Schema for AbiWord Markup Language", downloaded from http://www.abisource.com/awml.xsd, May 27, 2000, pp. 1-3.

Wen, Howard, "AbiWord: Open Source's Answer to Microsoft Word", Linux Dev Center, downloaded from http://www.linuxdevcenter.com/1pt/a/1636, Mar. 14, 2002, pp. 1-3.

Dzuba, Vassili, "Majix 1.0: A Word to XML Converter", downloaded from http://xml.coverpages.org/majix10Ann.html, Oct. 6, 1998, pp. 1-2.

Schmelzer, Ronald, "ZapThink Briefing Note—HyperVision—Automating Valid XML Document Creation Within Microsoft Word", ZapThink LLC, Feb. 8, 2002, pp. 1-6.

Alschuler, Liora, "Getting the Tags In: Vendors Grapple With XML-Authoring, Editing and Cleanup", Seybold Report on Internet Publishing, vol. 5, No. 6, Feb. 2001, pp. 1-6.

Moseley, Lonnie et al., "Mastering Microsoft Office 97 Professional Edition", Sybex, 1996, pp. 87, 94-98, 103-105, 106-179, 1114-1115.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing For Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for AbiWord Markup Language", http://www.abisource.com/awml.xsd>, Apr. 27, 2000, 3 pgs.

Liefke, Harmut et al., "Xmill: An Efficient Compressor for XML Data", SCM SIGMOND Record, vol. 29, Issue 2, May 2000, pp. 153-164.

McGrath, Robert, "Representing "Binary" Data in XML", downloaded from http://ndf.ncsa.uiuc.edu/HDF5/XML/tools/binary.html, Mar. 2001, pp. 1-4.

Jeong, Euna et al., "Semistrutured Data: Induction of Integrated View for XML Data With Heterogeneous DTDs", Proceedings of the Tenth International Conference on Information and Knowledge Management, Oct. 2001, pp. 151-158.

"XML Schema—Lecture 4 Notes", downloaded from http://www.cs.rpi.edu/~puninj/XMLJ/classes/class4/all.html, Nov. 21, 2001, pp. 1-14.

Mansfield, Ron, "Mastering Word 97 Fourth Edition", 1997, Sybex, pp. 269-270, 412, 449-457, 985-986, 1010-1011, 1028-1029, 1031-1034.

M. Schrage, "Proxima, A presentation-oriented editor for structured documents", IPA, ISBN 12-345-6789-0, Jun. 4, 1973, pp. 1-186.

V. Turau, "Making legacy data accessible for XML applications", University of Applied Sciences, Department of Computer Science, Wiesbaden, Germany, 1999, pp. 1-11.

J. Geigel et al., "Automatic Page Layout Using Genetic Algorithms for Electronic Albuming", Proceedings of Electronic Imaging, Jan. 21-26, 12 pgs.

M. Kirjavainen, "XML Browsers", http://mia.ece.uic.edu/~papers/WWW/MultimedicaStandards/XML_browsers.pdf, last accessed Mar. 14, 2005, 16 pgs.

Rusty Elliotte, "XML Bible", IDG Books Worldwide, Inc., 1999, pp. 1-12, 120-127, 333-335.

Microsoft, "Microsoft Word 2000", 1999, Microsoft, Screenshots 1-7, pp. 1-2.

Oliver Meyer, "Creating Validated XML Documents on the Fly Using MS Word", Oct. 20, 2002, pp. 113-121.

Simplson, J., "Just XML", Prentice Hall, Second Edition, 2001, cover, copyright page, and p. 31.

"Introduction to XML" University of Washington Computing and Communications, copyrignt 1999, on the Internet as of Jun. 24, 2001, downloaded from http://web.archive.org/web/20010624123830/http://www.washington.edu/computing/training/540/xml_well.html, 1 pg.

Munro, J., "StarOffice 6.0 Lives Up to its Name", PCMAG.com, May 23, 2002, www.pcmag.com/print_article2/0,1217,a=27287,00.asp, downloaded pp. 1-3.

Castro, E., "XML for the World Wide Web, Visual Quickstart Guide", Peachpit Press, 2001, p. 245.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Xmetal 1.0, Webreference.com, Oct. 29, 1999, downloaded pp. 1-2, www.webreference.com/html/watch/xmetal/5.html.

Altova Inc. & Altova GmbH, "XML Spy 4.0 Manual," copyright 1998-2001, Sep. 10, 2001, downloaded from: http://www.altova.com/downloaded.sub.—archive.html and link, pp. 18-286.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

M. Fernandez and S. Amer-Yahia; Advanced Technology Seminar 2—Techniques for Storing XML; pp. 323, 774-776.

Michael Champion; Storing XML in Databases; EAI Journal, Oct. 2001; pp. 53-55.

JP Morgenthal; XML for Data Integration; EAI Journal, Oct. 2001; pp. 13-14, 16.

Sihem Amer-Yahia, Mary Fernandez, Divesh Srivastava and Yu Xu; PIX: A System for Phrase Matching in XML Documents: A Demonstration; 2003 IEEE; pp. 774-776.

Altova Inc. & Altova GmbH, "XML Spy 4.0 Manual," copyright 1998-2001, published Sep. 9, 2001, pp. 1-401.

Alshuler, L., "Getting the Tags In: Vendors Grapple with XML-Authoring, Editing and Cleanup," The Seybold Report on Internet Publishing, vol. 5, No. 6, Feb. 2001, pp. 1-6.

HV, Ltd., "WorX Standard Edition (SE) 'XML Authoring Made Easy',"HyperVision, Ltd., published on the Internet as of Jun. 3, 2001 as a PDF file linked to http://web.archive.org/web/20010603152210/www.hvltd.com/default.asp? name=information/xml/worxseOverview.xml&display=information/xsl/default.xsl, pp. 1-9.

Mathias Neumuller and John N. Wilson; Improving XML Processing Using Adapted Data Structures; Oct. 7-10, 2002; pp. 206-220.

Surajit Chaudhuri and Kyuseok Shim; Storage and Retrieval of XML Data using Relational Databases; Advanced Technology Seminar 4; Abstract; Mar. 5, 2003; p. 802.

Ullas Nambiar et al.; Efficient XML Data Management: An Analysis; EC-Web 2002, LNCS 2455; pp. 87-98.

Volkan Atalay and Erkan Arslan; An SGML Based Viewer for Form Documents; 1999 IEEE Jul. 1999; pp. 201-204.

Xin Zhang et al.; Clock: Synchronizing Internal Relational Storage with External XML Documents; 2001 IEEE Jun. 2001; pp. 111-118.

Robert D. Cameron; REX: XML shallow parsing with regular expressions; Markup Languages: Theory & Practice 1.3, Summer 1999; pp. 61-88.

Danny Heijl; The Delphi XML SAX2 Component & MSXML 3.10; Dr. Dobb's Journal, Sep. 2001; pp. 42-54.

Chiyoung Seo et al.; An efficient inverted index technique for XML documents using RDBMS; Received Jan. 16, 2002; Information and Software Technology 45 (2003), Jun. 1, 2002; pp. 11-22.

Torsten Grabs et al.; XMLTM: Efficient Transaction Management for XML Documents; CIKM'02, Nov. 4-9, 2002; pp. 142-152.

Michael Floyd, "Debugging XML Applications", Aug. 2000, www.webtechniques.com, pp. 79-81.

James E. Powell, "Microsoft Office Beta 2 on the Horizon", WinMag.com, Nov. 3, 2000.

Millbery, J., "WorX SE", XML Journal, published Feb. 4, 2001, downloaded from http://xml.sys-con.com/read/40149.htm, downloaded pp. 1-5.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

Altamura et al., "Transforming paper documents into XML format with WISDOM++", Nov. 7, 2000, IJDAR, pp. 6-12.

Klink et al., "Document Structure Analysis Based on Layout and Textual Features", Sep. 25, 2000, DFKI, pp. 1a, 3, 4, and 11.

"Creating DocBook Documents", Aug. 2, 2001, pp. 1 and 16, http://web.archive.org/web/20020615124747/www.docbook.org/tdg/en/html/ch02.html.

David Eisenberg, "Using XSL Formatting Objects", Jan. 17, 2001, pp. 1a and 1, http://www.xml.com/pub/a/2001/01/17/xsl-fo/index.html?page=2.

"Star Office XML File Format Working Draft", Sun Microsystems, Inc., pp. 57, 59.

W. Wadge, "Intensional Markup Language", Proceedings of the Third International Workshop, DCW 2000, Quebec City, Canada, Jun. 19-21, 2000, pp. 82-89.

Unicode Inc., "Unicode Technical Reports", Sep. 21, 2002, pp. 1, 2, 638, 642, and 644.

Star Office XML File Format Working Draft, Sun Microsystems, Inc., pp. 1, 19, and 196.

Rohr, Paul, "RE: Styles Again", downloaded from http://www.abisource.org/mailinglists/abiword-dev/01/May/0561.html, May 2001, pp. 1-2.

W3C, "XML Schema Requirements", W3C Note, Feb. 15, 1999, downloaded from www.w3.org/TR/NOTE-xml.schema-req, pp. 1-5.

Ray, Erik T., "Learning XML", O'Reilly & Associates, Inc., Jan. 2001, cover, copyright, and Chapter 5 downloaded pp. 1-25.

Glenn, Walter, "Word 2000 in a Nutshell", O'Reilly & Associates, Inc., Aug. 2000, cover, copyright, and sections 16.4 and 16.3, downloaded pp. 1-8.

Liberty, J. et al., "XML Web Documents from Scratch", Que Corporation, Mar. 10, 2000, cover, copyright, chapters 1 and 2, downloaded pp. 1-16.

Watchorn, H. et al., "Word and XML: Making the 'Twain Meet'", XML Europe 2001, papers, May 2001, downloaded pp. 1-11.

Novak, U. et al., "Experimental XSLT Processor for Objects", Proceedings of the JASTED Int'l Conf. On Applied Informatics, Feb. 2002, pp. 277-282.

XML Workshop Ltd., "Word to XML Converters", Mar. 7, 2003, downloaded pp. 1-2.

YAWC Pro, "Welcome to YAWC Pro", Dec. 11, 2001, 1 pg.

"YAWC Pro 1.0 Installation & User Guide", pp. 1-11.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typesetting XML with QuarkXPress", YAWC Pro, 1 pg.

Skylar, D., "The Annotated Rainbow DTD, Rainbow Version 2.5", Electronic Book Technologies, Inc., Feb. 8, 1995, pp. 1-12.

Tetrasix, "Welcome to Tetrasix Web Site", re: MajiX, Apr. 18, 2001, downloaded pp. 1-3.

Infinity-Loop, Web Site Home Page, re: infinity-loop, Apr. 20, 2001, 1 pg.

Sun Microsystems, "The OpenOffice.org Source Project", Sun Microsystems, Inc., 2000, downloaded pp. 1-34.

Harold, Rusty Elliotte, "XML Bible", IDG Books Worldwide, 1999, pp. 369-388.

W3C, "XML Schema Part 0: Primer", W3C Recommendation, May 2, 2001, downloaded pp. 1-67.

Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.

Lemay, Laura, "Teach Yourself Web Publishing with HTML 4 in 14 Days, Professional Reference Edition", Second Edition, Sams.net Publishing, 1997, pp. 778-789.

White, B. et al., "Standard Structural Elements" from "Web Content Accessibility Tips and Tricks", May 1, 2001, downloaded pp. 1-4.

Juran, J., "MML: The Modest Markup Language", Oct. 22, 2000, downloaded pp. 1-15.

University of Georgia Center for Continuing Education, "Exploring the World-Wide Web, Hypertext Markup Language", Feb. 24, 1999, downloaded pp. 1-7.

Cagle et al., "Professional XSL", Wrox Press Ltd., 2001, cover and copyright pp. 9-21.

* cited by examiner

REPRESENTING USER EDIT PERMISSION OF REGIONS WITHIN AN ELECTRONIC DOCUMENT

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Electronic documents are often edited by multiple users. For example, a document can be written by a reporter, and then modified by a news editor. In other cases, a former document can be provided by an employer, which is then "filled out" by employees. In such cases, it is desirable to only allow certain regions of the electronic document to be edited. In some cases, electronic documents may be edited by applications that do not "understand" the file protection scheme used by the application that was used to originally author the electronic documents. What is needed is a way to easily handle a variety of protection settings and editing rights when transforming a document into an ML format.

SUMMARY OF THE INVENTION

The present invention is directed towards defining regions within editable objects of electronic document such that specific editing permissions can be granted to specific users for specific regions. The regions can be expressed in an ML format such that a variety of applications that consume ML content can operate in accordance with the granted permissions.

According to one aspect of the invention, a computer-readable medium having computer-executable components comprises four components. The first component is arranged to edit an electronic document having editable objects. An editable object can be, for example, a selectable region that comprises paragraphs, characters, tables, images, rows, cells, columns, and/or text. The second component is arranged to define a first location for the start of an editable object region for which a level of editing permission for a specific user is desired and to define a second location for the end of the editable object region. The third component is arranged to associate a user identifier for the specific user with the text region that is defined by the first and second locations. The fourth component is arranged to encode in an ML format the electronic document, a first element that defines the first location, and a second element that defines the second location, wherein one of the first and second element further comprises the user identifier.

According to another aspect of the invention, a method for handling electronic documents comprises editing an electronic document having editable objects. A first location is defined for the start of an editable object region for which a level of editing permission for a specific user is desired. A second location is defined for the end of the editable object region. A user identifier for the specific user is associated with the text region that is defined by the first and second locations. The electronic document, a first element that defines the first location, and a second element that defines the second location are encoded in an ML format, wherein one of the first and second elements further comprises the user identifier.

According to yet another aspect of the invention, a system for displaying and modifying electronic documents comprises an electronic document file, an editor, and an encoder. The electronic document file comprises editable objects. The editor is arranged to define a first location for the start of an editable object region for which a level of editing permission for a specific user is desired, to define a second location for the end of the editable object region, and to associate a user identifier for the specific user with the text region that is defined by the first and second locations. The encoder is configured to encode in an ML format the electronic document, a first element that defines the first location, and a second element that defines the second location, wherein one of the first and second elements further comprises the user identifier.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc). The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
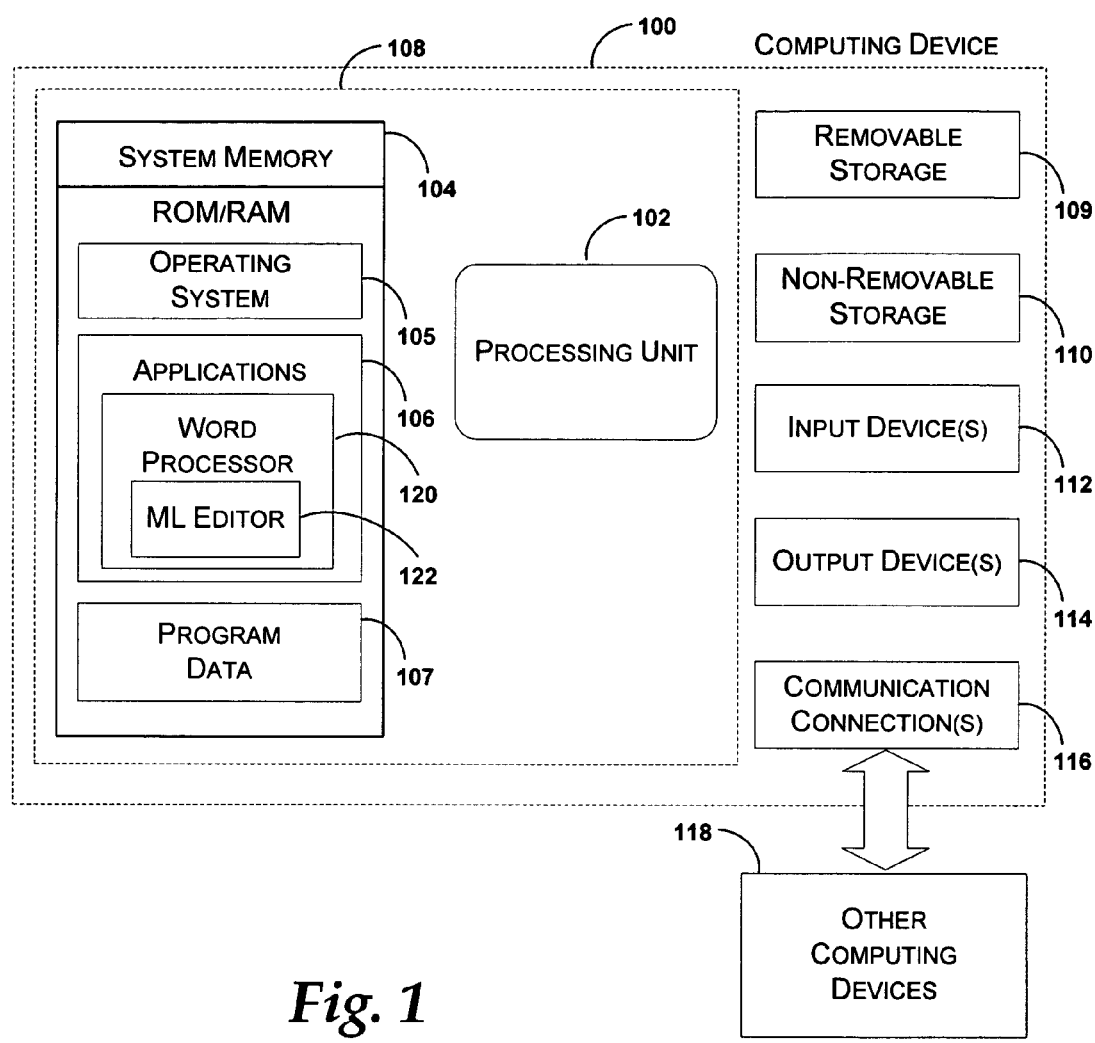
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes ML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
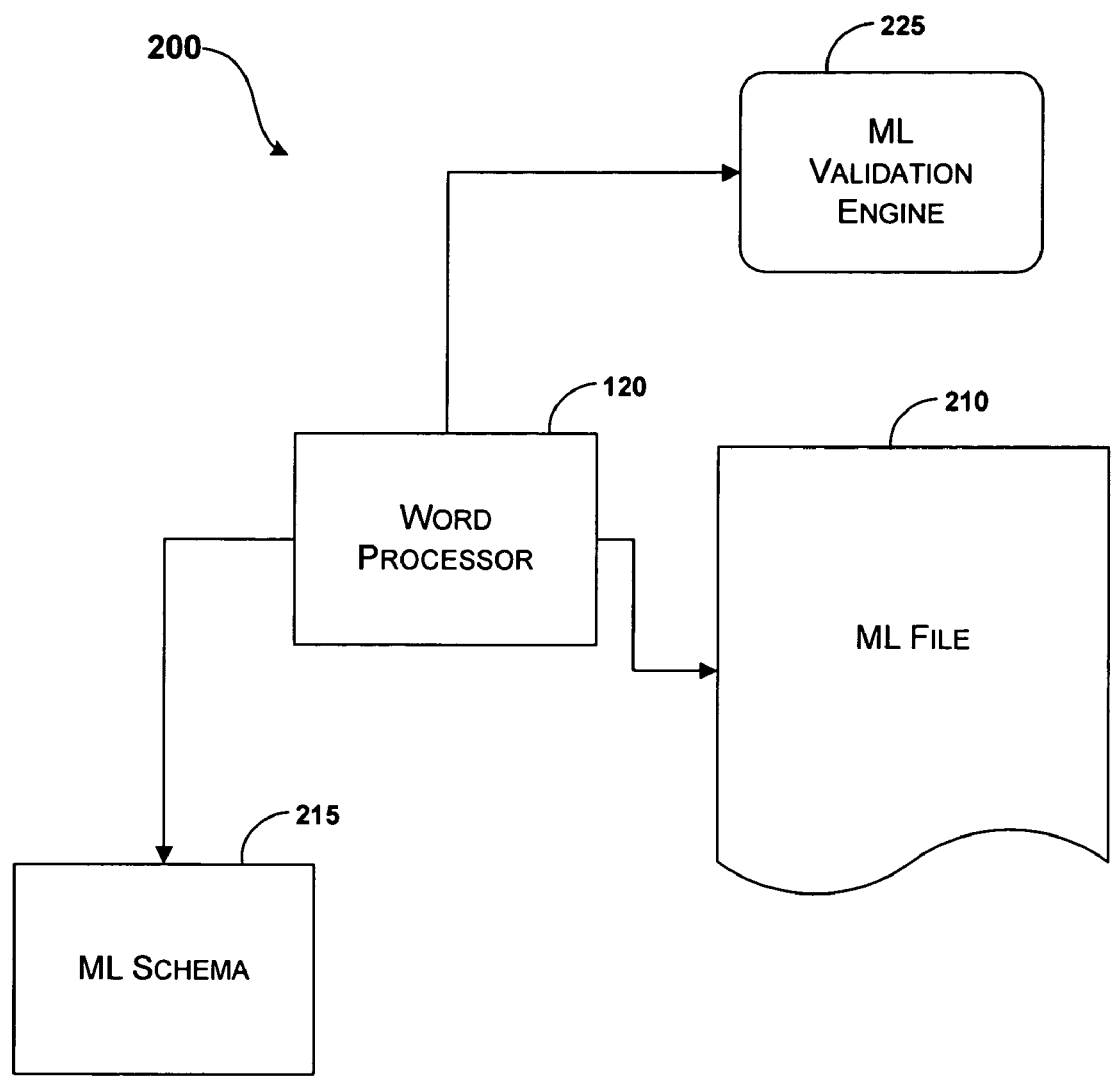
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML.

Word-processor 120 internally validates ML file 210. When validated, the ML elements are examined as to whether they conform to the ML schema 215. As previously described above, a schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Figure 3:
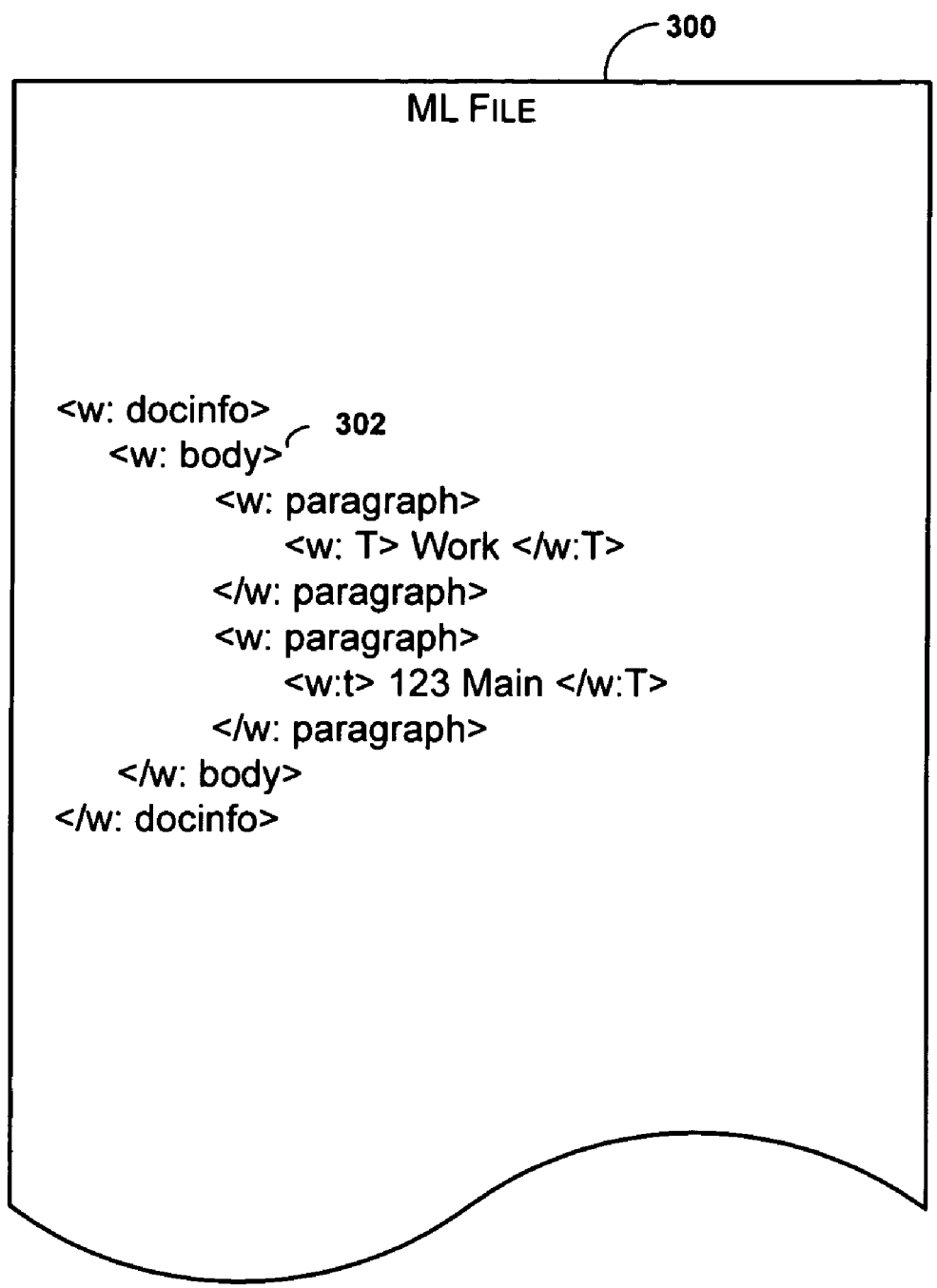
FIG. 3 illustrates an exemplary ML file in accordance with aspects of the present invention.

FIG. 3 illustrates an exemplary ML file in accordance with aspects of the present invention. ML file 300 includes ML elements. An element in a markup language usually includes an opening tag (indicated by a "<" and ">"), some content, and a closing tag (indicated by a "</" and ">"). In this example, tags associated with ML include a "w:" within the tag (e.g., 302). The "w:" prefix is used as shorthand notation for the namespace associated with the element.

The text contained within the document follows the "T" tag, making it relatively easy for an application to extract the text content from a word-processing document created in accordance with aspects of the invention. Given that the example shown is valid, ML file 210 produces a document with a body and two paragraphs that include the text "Work" in the first paragraph and "123 Main" in the second paragraph.

The text contained within the document can be displayed according to styles that can be declared in the ML file. Typically, the styles declarations are declared near the top of the ML file, which allows the styles to be referenced by various objects in the body of the document. For example, a root element "w:wordDocument" can be used to declare the child element "w:styles," which can be used to store the style definitions.

Figure 4:
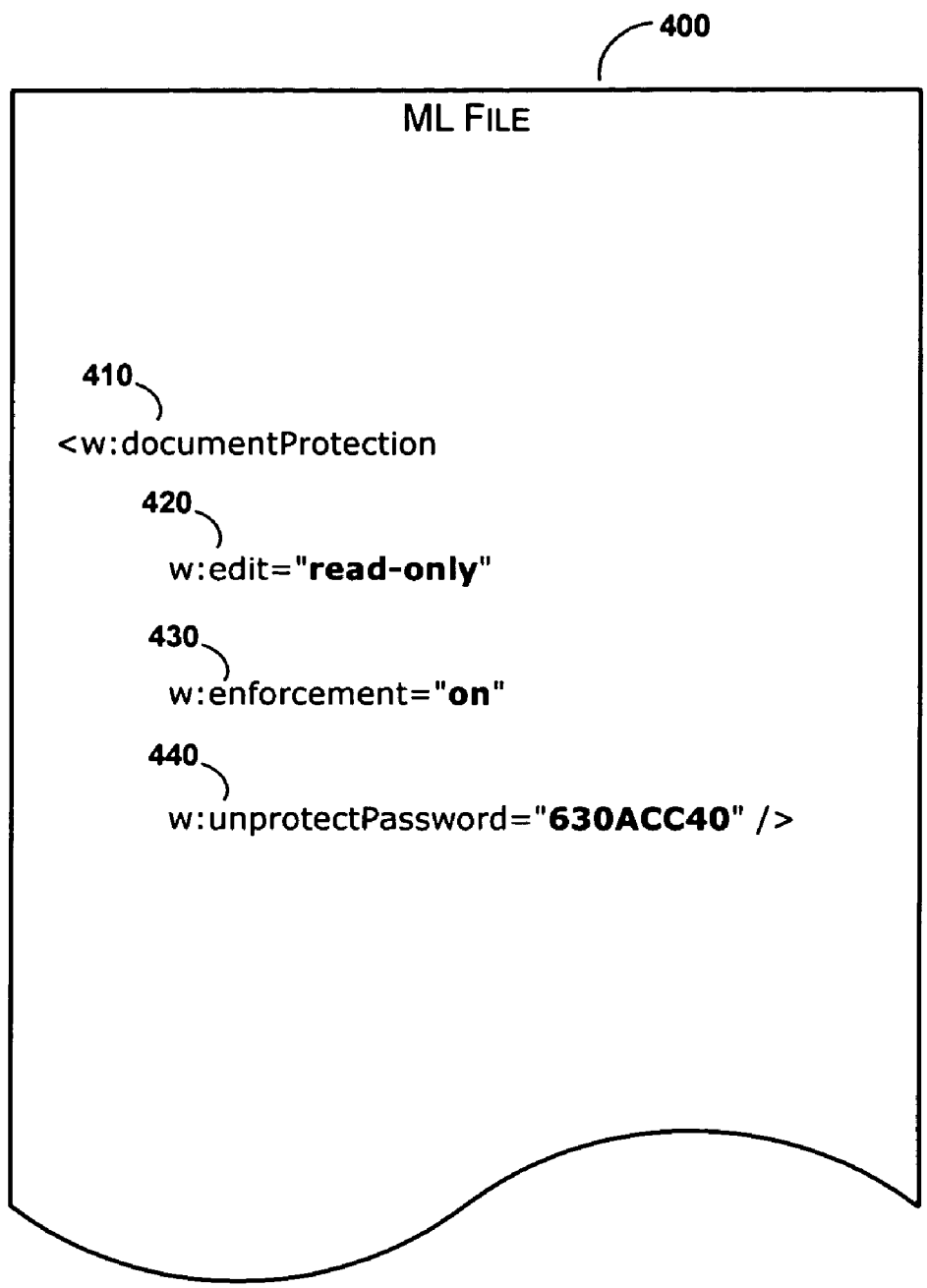
FIG. 4 illustrates an exemplary protection element, in accordance with aspects of the present invention.

FIG. 4 illustrates an exemplary protection element, in accordance with aspects of the present invention. The figure illustrates listing 400 having a protection element (410) in which the example attributes are listed. Protection element 410 comprises attributes including an edit attribute (420), an enforcement attribute (430), and a password protection attribute (440).

Protection element 410 ("document Protection") is typically a child element of a "docPr" element. The (parent) docPr element is typically used to represent document-wide settings, which can apply to elements that are associated with electronic documents as well as the entire document itself.

Protection element 410 is used to represent an electronic document's overall protection settings or state. The protection settings may include settings such as a protection mode, a password (if any), or whether protection enforcement has been activated (or not). The protection settings can be included as attributes of protection element 410.

Editing attributes can be used to impose certain editing the restrictions on an entire document (or sections). For example, a user can specify that an electronic document can only be edited with the "track changes" option enabled. Additionally, the user can specify that while only comments can be inserted into the document, the actual contents of the document cannot be changed. Furthermore, the author of the document can specify that nothing in the document can be changed and that the document is restricted to "read-only" access only.

It is also possible to override the user settings that specify how the document or arbitrary pieces of text within a document can be protected. For example, specific users (or users that are associated with specific workgroups) can override the restrictions a user places on an electronic document such that named users (or workgroups) can have fuller editing rights to those pieces (or regions) of text. These specific users can be given full editing rights, or restricted editing rights that are restricted differently from the document-wide protection mode.

Accordingly, the editing capabilities of a user who has not been given special editing rights to a given region of text is typically limited to just the editing capabilities that are determined by the document-level protection. Alternatively, those users who have been assigned editing rights that are specific to regions of text can typically edit the region of text more freely than what the level of protection applied to the entire document/section will allow. This give those users/ groups that have been granted permission more flexibility than the users who have not been assigned special editing rights.

Edit attribute 420 can be used to represent those types of protection that can be applied to unauthorized or unauthenticated users at the document or section level. Possible values for edit attribute 420 include "read-only," which can be used to prevent the document from being edited in any way. Another possible value is "comments," which can be used to allow only comments to be inserted into the document. Other values for various editing restrictions can be named such as, for example the "track changes" protection mode described above.

Enforcement attribute 430 can be used to indicate whether the protection mode is actually enabled. Possible values for the enforcement attribute include "on" for when protection enforcement is enabled, and "off" for when protection enforcement is not enabled. Other possible values may be named for intermediate levels of enforcement, to enable degrees of enforcement between being fully enabled and completely disabled modes of enforcement.

Password protection attribute 440 can be used to indicate whether a password is to be used to protect a defined region of text. (A defined region of text may include only a portion of the text within an electronic document or all of the text within electronic document.) The value for the password protection attribute can be an encrypted version of the password itself (or, for example, a digital signature of the password). Alternatively, possible values for the password attribute may just be blank, in the case of there being no password specified.

Accordingly, FIG. 4 illustrates an example instance of protection element 410. The example instance of protection element 410 comprises edit attribute 420 having a value of "read-only," enforcement attribute 430 having a value of "on," and password protection attribute 440 having a value that is the encrypted password.

Figure 5:
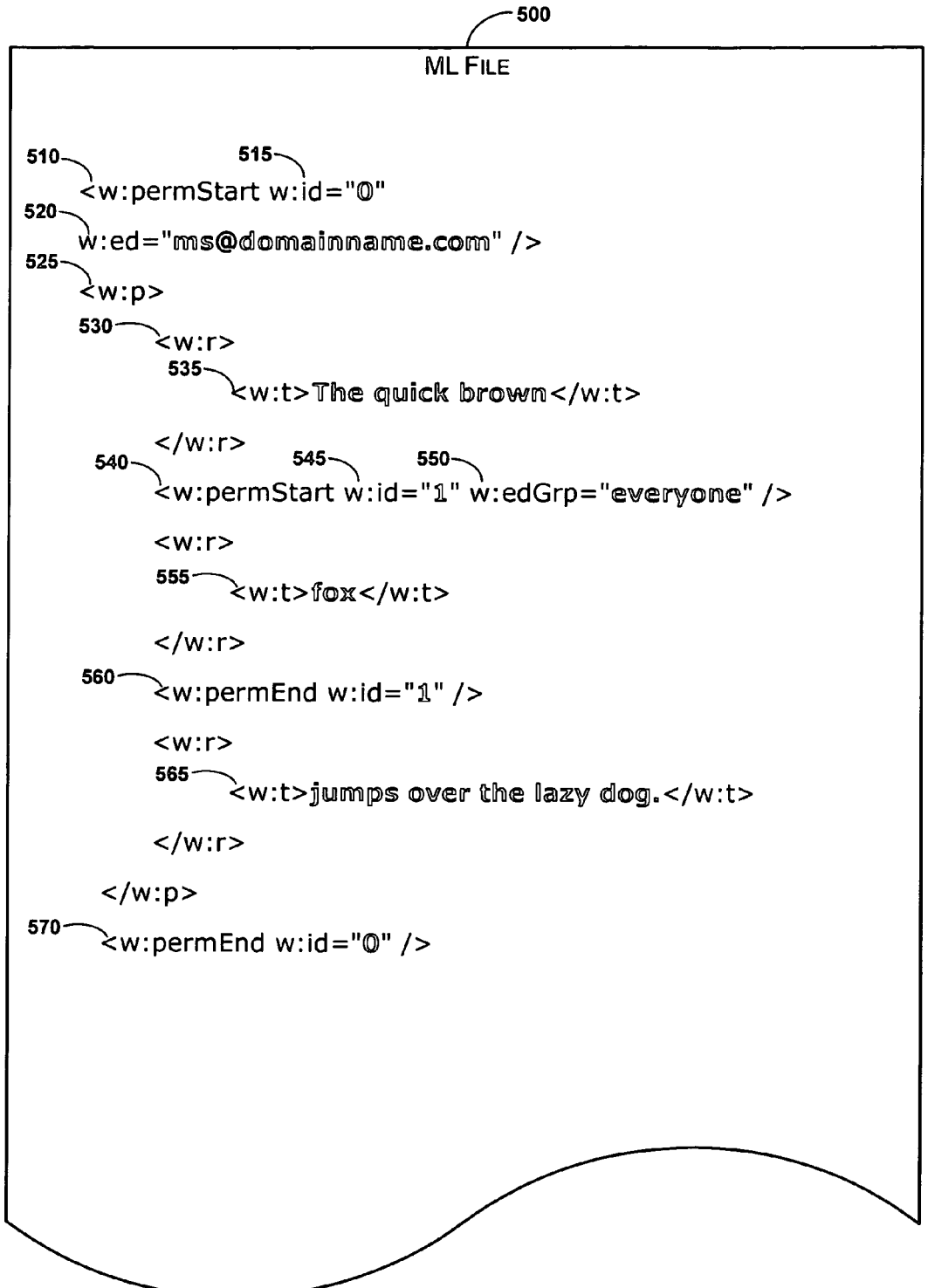
FIG. 5 illustrates an exemplary permission start element and permission end element, in accordance with aspects of the present invention.

FIG. 5 illustrates an exemplary permission start element and permission end element, in accordance with aspects of the present invention. The figure illustrates an example listing 500, which provides a demonstration of the usage of permission start elements 510 and 540. Permission start element 510 is associated with permission end element 570 and permission start element 540 is associated with permission and element 560.

The permission start element and the associated permission end element define a region of text that can be used to indicate the beginning of a region of text for which the document's editing restrictions are overridden for specified users and/or workgroups. The permission start element is a possible sibling of a paragraph element (e.g., 525) or a text run element (e.g., 530), which is used to represent the text run inside a paragraph, as well as any other object that the editing permissions may be applied to. In one instance, a separate permission start element may be used for each user or workgroup for which protection is desired. It may also be possible to specify all the users in one permission tag if that group's permissions are the same.

The permission start element (e.g., 510) typically comprises attributes including an identifier attribute (515); and one or more of an edit attribute (520) and/or an edit group identifier (515). The identifier attribute is used to uniquely identify the pairing of the permission start tag with the permission end tag. The identified user is granted specific permission to edit the specific region of text according to the specific permission that is associated with the identifier attribute by the application that is used to edit the file.

The editor element is typically a string that identifies the individual user to which this permission is assigned. The editor element can be, for example, an operating system user name, an e-mail address, or any other string that can be used to uniquely identify the user to which the permission belongs.

The group better element is typically a string that identifies a named group to which this permission is assigned. The group editor element can be, for example, it could be a built-in (with respect to the operating system) group named such as "everyone", other aliases that are used to represent groups of one or more individuals, and the like.

A permission end element (e.g., 560) is used to indicate the end of a region of text having editing permissions that are associated with a corresponding permission start element (e.g., 540). The permission end element comprises an identifier attribute that provides a one-to-one correspondence with the identifier attribute of a corresponding permission start element. This enables for the corresponding start and end element to be properly identified and paired. This approach is preferable to using just one tag to span the entire permission range, because it ensures that a well formed XML document is produced. (Well formed XML documents are disclosed in U.S. patent application Ser. No. 10/727,276, filed on Dec. 3, 2003, entitled "REPRESENTING NON-STRUCTURED FEATURES IN A WELL FORMED DOCUMENT," which is hereby incorporated by reference.)

The permission end element is a possible sibling of a paragraph element or a text run element. Accordingly, each permission end element is associated with a corresponding permission start element. Each permission end element is matched with the corresponding permission start element by matching the identifier attribute of the permission end element with the identifier attribute of the permission start element. The matching identifier attributes allow the permission start element and the permission end element to be associated having a one-to-one correspondence.

The example markup language in the figure represents the sentence "the quick brown fox jumps over the lazy dog." The representative sentence as a whole is editable by an individual identified as ms@domainname.com. Additionally, the word "fox" is editable by a group identified as "everyone."

Although the text region identified by permission start element 540 is shown as being nested within the text region identified by permission start element 510, it is possible to overlap the text regions. For example, exchanging the identifier attributes of permission end elements 560 and 570 would result in overlapping text regions.

Figure 6:
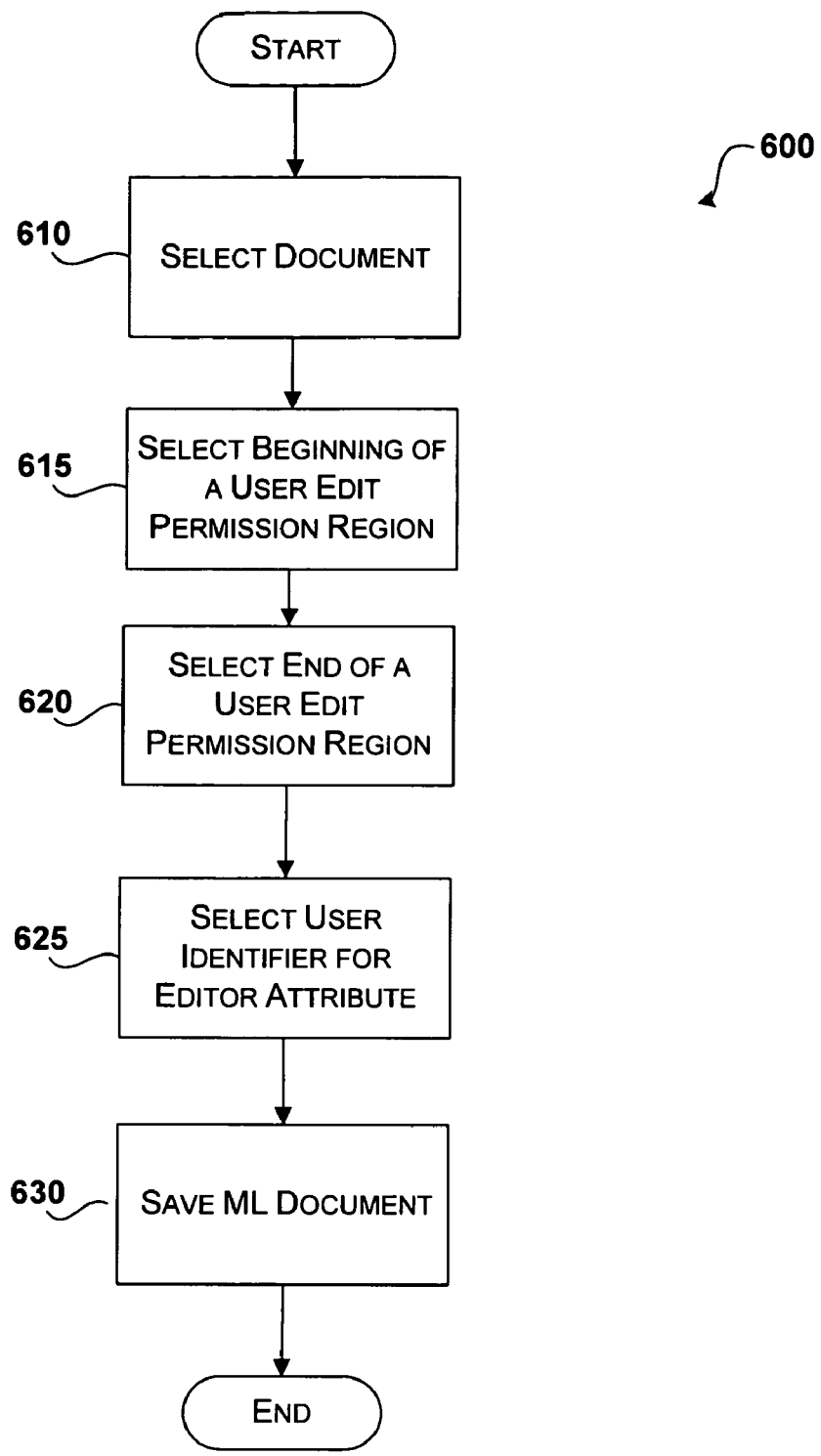
FIG. 6 illustrates of a process flow for representing user edit permission regions within an electronic document, in accordance with aspects of the invention.

FIG. 6 illustrates of a process 600 flow for representing user edit permission regions within an electronic document, in accordance with aspects of the invention. After a start block, the process moves to block 610, at which point a document is opened for editing by a user who would like to restrict user edit permissions for text regions within the opened document. The selection of the file for opening may, for example, include highlighting the selected file within a file browser. The document may be, for example, a document that includes paragraphs and text runs. The document may also be, for example, a document that includes spreadsheet cells or word-processor paragraphs. The document can be stored in a proprietary format of the editor process.

At block 615, the location for the beginning of a user edit permission region (i.e., the permission start element) is selected. The selection of the beginning of the region may, for example, include using a mouse to pilot a cursor to a specific location within the document and depressing a button on the mouse.

Continuing at block 620, the location for the end of a user edit permission region (i.e., the permission end element) is selected. The selection of the end of the region may, for example, include dragging mouse to a second location within the document and releasing the depressed mouse button.

At block 625, a value is selected for the editor (or group editor) attribute of the permission start element. The value can, for example, default to "everyone" or can be specified by the user who can supply a user name within a dialog box. A unique identifier is typically assigned to the permission start element and the permission end element such that the same identifier is assigned to both. Additionally a level of editing permissions can be selected by the user, which can be encoded within the unique identifier that is assigned to both the permission start and permission end elements.

At block 630, the document is saved using an ML format. The beginning and the ending locations for the selected user edit permission region are encoded in the saved file using a permission start element and a permission end element. The permission start element contains a unique identifier that typically matches the unique identifier of the permission end element. The permission start element also typically contains the editor attribute (which specifies the user or group that has permission to edit the region). Alternatively (or conjunctively), the permission end element could be defined to store the editor attribute.

As a further illustration of representing user edit permission regions within an electronic document within electronic documents, a schema is provided as follows:

Document Properties for Protection State:

```
<xsd:element name="documentProtection" type="docProtectProperty"
minOccurs="0">
    <xsd:annotation>
        <xsd:documentation>Helps prevent unintentional changes to
all or part of an online form or document, as specified (Protect
Document option). </xsd:documentation>
    </xsd:annotation>
</xsd:element>
<xsd:complexType name="docProtectProperty">
    <xsd:annotation>
        <xsd:documentation>Helps prevent unintentional changes to
all or part of an online form or document as
specified. </xsd:documentation>
    </xsd:annotation>
    <xsd:attribute name="edit" type="docProtectValue"
use="optional">
        <xsd:annotation>
            <xsd:documentation>Gets or sets editing
restrictions. Helps prevent unintentional editing changes as
specified. </xsd:documentation>
        </xsd:annotation>
    </xsd:attribute>
    <xsd:attribute name="formatting" type="onOffType"
use="optional">
        <xsd:annotation>
            <xsd:documentation>Gets or sets formatting
restrictions. Prevents unintentional formatting changes except as
allowed. This setting does not have an effect unless the
formattingEnabled attribute is on. </xsd:documentation>
        </xsd:annotation>
    </xsd:attribute>
    <xsd:attribute name="enforcement" type="onOffType">
        <xsd:annotation>
            <xsd:documentation>Gets or sets whether the
specified restrictions are currently being enforced for this
document. </xsd:documentation>
        </xsd:annotation>
    </xsd:attribute>
    <xsd:attribute name="unprotectPassword" type=
"longHexNumberType"
use="optional">
        <xsd:annotation>
            <xsd:documentation>Gets or sets password key to
```

-continued

```
unprotect this document from unintentional formatting/editing changes.
This password is not secure.</xsd:documentation>
            </xsd:annotation>
        </xsd:attribute>
    </xsd:complexType>
    <xsd:simpleType name="docProtectValue">
        <xsd:annotation>
            <xsd:documentation>Defines document-protection editing-
restriction values. </xsd:documentation>
        </xsd:annotation>
        <xsd:restriction base="xsd:string">
            <xsd:enumeration value="none">
                <xsd:annotation>
                    <xsd:documentation>No document protection;
reviewers may make any changes to the document.</xsd:documentation>
                </xsd:annotation>
            </xsd:enumeration>
            <xsd:enumeration value="read-only">
                <xsd:annotation>
                    <xsd:documentation>Let's reviewers make no
changes to the document.</xsd:documentation>
                </xsd:annotation>
            </xsd:enumeration>
            <xsd:enumeration value="comments">
                <xsd:annotation>
                    <xsd:documentation>Let's reviewers insert
comments but does not let reviewers change the contents of the
document.</xsd:documentation>
                </xsd:annotation>
            </xsd:enumeration>
            <xsd:enumeration value="tracked-changes">
                <xsd:annotation>
                    <xsd:documentation>Let's reviewers change a
document but highlights all changes so that the author can track
changes. While a document is protected for tracked changes, you
cannot turn orr changes tracking nor can you accept or reject tracked
changes.</xsd:documentation>
                </xsd:annotation>
            </xsd:enumeration>
            <xsd:enumeration value="forms">
                <xsd:annotation>
                    <xsd:documentation>Protects a document from
changes except in form fields or unprotected sections. To turn
protection on or off for a section see the 'FormProt' element inside
'sectPr'.</xsd:documentation>
                </xsd:annotation>
            </xsd:enumeration>
        </xsd:restriction>
    </xsd:simpleType>
```

Inline Editing Permissions:

```
<xsd:element name="permStart" minOccurs="0" type="permStartElt">
    <xsd:annotation>
        <xsd:documentation>Represents the range protection
permission start.</xsd:documentation>
    </xsd:annotation>
</xsd:element>
<xsd:element name="permEnd" minOccurs="0" type="permElt">
    <xsd:annotation>
        <xsd:documentation>Represents the range protection
permission end.</xsd:documentation>
    </xsd:annotation>
</xsd:element>
<xsd:complexType name="permStartElt">
    <xsd:annotation>
        <xsd:documentation>Defines the range protection permission
start.</xsd:documentation>
    </xsd:annotation>
    <xsd:complexContent>
        <xsd:extension base="permElt">
            <xsd:attribute name="edGrp" type="edGrpType"
use="optional">
                <xsd:annotation>
```

-continued

```
                    <xsd:documentation>Gets or sets the
group with edit permissions</xsd:documentation>
                </xsd:annotation>
            </xsd:attribute>
            <xsd:attribute name="ed" type="stringType"
use="optional ">
                <xsd:annotation>
                    <xsd:documentation>Gets or sets the user
with edit permissions</xsd:documentation>
                </xsd:annotation>
            </xsd:attribute>
            <xsd:attribute name="col-first"
type="decimalNumberType" use="optional">
                <xsd:annotation>
                    <xsd:documentation>For table range
permissions, specifies the beginning column for the
permission.</xsd:documentation>
                </xsd:annotation>
            </xsd:attribute>
            <xsd:attribute name="col-last"
type="decimalNumberType" use="optional">
                <xsd:annotation>
                    <xsd:documentation>For table range
permissions, specifies the ending column for the
permission. </xsd:documentation>
                </xsd:annotation>
            </xsd:attribute>
        </xsd:extension>
    </xsd:complexContent>
</xsd:complexType>
<xsd:simpleType name="edGrpType">
    <xsd:annotation>
        <xsd:documentation>Defines a group with edit
permissions.</xsd:documentation>
    </xsd:annotation>
    <xsd:restriction base="xsd:string">
        <xsd:enumeration value="none"></xsd:enumeration>
        <xsd:enumeration value="everyone"></xsd:enumeration>
        <xsd:enumeration value="administrators"></xsd:enumeration>
        <xsd:enumeration value="contributors"></xsd:enumeration>
        <xsd:enumeration value="editors"></xsd:enumeration>
        <xsd:enumeration value="owners"></xsd:enumeration>
        <xsd:enumeration value="current"></xsd:enumeration>
    </xsd:restriction>
</xsd:simpleType>
<xsd:complexType name="permElt">
    <xsd:annotation>
        <xsd:documentation>Defines a permission for the
document.</xsd:documentation>
    </xsd:annotation>
    <xsd:attribute name="id" type="stringType" use="required">
        <xsd:annotation>
            <xsd:documentation>Gets or sets the ID for this
permission.</xsd:documentation>
        </xsd:annotation>
    </xsd:attribute>
    <xsd:attribute name="displacedBySDT" type=
"displacedBySDTValue"
use="optional">
        <xsd:annotation>
            <xsd:documentation>When bookmarks border Structured
Document Tags (SDTs), this attribute ensures that bookmarks are
inserted into the document next to the SDTs. We use this attribute
because SDTs appear in our XML how they logically appear in the Word
document, but not necessarily in the same location as they are in the
document. When we displace the SDTs, we also displace the bookmarks
next to them so that the intended result is in the XML
file.</xsd:documentation>
        </xsd:annotation>
    </xsd:attribute>
</xsd:complexType>
```

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer-executable components, comprising:
    a first component that is arranged to edit an electronic document having editable objects;
    a second component that is arranged to:
        define a global protection element for the electronic document, wherein the global protection element defines document-wide user permission for the editable objects of the electronic document, and
        set an override to override the global protection element, wherein setting the override includes defining a first location for the start of an editable object region for which a level of editing permission for a specific user is associated and defining a second location for the end of the editable object region for which a level of editing permission for a specific user is associated;
    a third component that is arranged to associate a user identifier for the specific user with the object region that is defined by the first and second locations, wherein the user identifier indicates the specific user having the level of editing permission indicated by the unique identifier;
    a fourth component that is arranged to:
        encode the global protection element into the ML format, wherein the global protection element includes an edit attribute that indicates a document-wide user permission for the editable objects, and
        encode the override into the ML format, wherein the override includes a start permission tag for at least one editable object of the electronic document, wherein the override includes an end permission tag for the at least one editable object of the electronic document, wherein the override includes a specific user identifier that causes an override of the global protection element for the at least one editable object for the specific user in accordance with the level of editing permission of the override while other editable objects of the electronic document are enforced according to the global protection element; and
    a fifth component that is arranged to output an ML file according to the ML format.

2. The computer-readable medium of claim 1, wherein the electronic document is a word-processor document.

3. The computer-readable storage medium of claim 2, wherein the editable objects comprise one of paragraphs, characters, tables, images, rows, cells, columns, text, and objects native to the application.

4. The computer-readable storage medium of claim 1, wherein the electronic document is a spreadsheet document.

5. The computer-readable storage medium of claim 4, wherein the editable objects are cells.

6. A method for handling electronic documents, comprising:
    editing an electronic document having editable objects;
    defining a global protection element for the electronic document, wherein the global protection element defines document-wide user permission for the editable objects of the electronic document;
    setting an override to override the global protection element, wherein setting the override includes defining a first location for the start of an editable object region for which a level of editing permission for a specific user is associated and defining a second location for the end of the editable object region for which a level of editing permission for a specific user is associated;
    associating a user identifier for the specific user with the editable object region that is defined by the first and second locations, wherein the user identifier indicates the specific user having the level of editing permission indicated by the unique identifier; and
    encoding the electronic document into an ML format, wherein encoding the electronic document into the ML format includes:
        encoding the global protection element into the ML format, wherein the global protection element includes an edit attribute that indicates a document-wide user permission for the editable objects, wherein the encoded global protection element includes an enforcement attribute that indicates whether the edit attribute is actuated, wherein the encoded global protection element includes a password attribute that indicates whether the electronic document is password protected;
        encoding the override into the ML format, wherein the override includes a start permission tag for at least one editable object of the electronic document, wherein the override includes an end permission tag for the at least one editable object of the electronic document, wherein the override includes a specific user identifier that causes an override of the global protection element for the at least one editable object for the specific user in accordance with the level of editing permission of the override while other editable objects of the electronic document are enforced according to the global protection element.

7. The method of claim 6, wherein the electronic document is a word-processor document.

8. The method of claim 7, wherein the editable objects comprise one of paragraphs, characters, tables, images, rows, cells, columns, text, and objects native to the application.

9. The method of claim 6, wherein the electronic document is a spreadsheet document.

10. The method of claim 9, wherein the editable objects are cells.

11. A computer system for displaying and modifying electronic documents, comprising:
    an electronic document file that comprises editable objects;
    an editor that is arranged to:
        define a global protection element for the electronic document, and
        set an override to override the global protection element, wherein setting the override includes defining a first location for the start of an editable object region for which a level of editing permission for a specific user is associated and defining a second location for the end of the editable object region for which a level of editing permission for a specific user is associated;
    an encoder that is configured to:
        encode the global protection element into the ML format, and
        encode the override into the ML format, wherein the override includes a start permission tag for at least one editable object of the electronic document, wherein the override includes an end permission tag for the at least one editable object of the electronic document, wherein the override includes a specific user identifier that causes an override of the global protection element for the at least one editable object for the specific user in accordance with the level of editing permission of the override.

12. The system of claim 11, wherein the electronic document is stored in a proprietary format.

13. The system of claim 11, wherein the electronic document is a word-processor document.

14. The system of claim 13, wherein the editable objects comprise one of paragraphs, characters, tables, images, rows, cells, columns, text, and objects native to the application.

15. The system of claim 11, wherein the electronic document is a spreadsheet document.

16. The system of claim 15, wherein the editable objects are cells.

\* \* \* \* \*